United States Patent [19]

Hayashi et al.

[11] Patent Number: 5,573,673
[45] Date of Patent: Nov. 12, 1996

[54] HYDROUS COMPOSITE CERIUM-PHOSPHORUS OXIDE FOR IMMOBILIZATION OF STRONTIUM IONS IN SOLUTION

[75] Inventors: Hiromichi Hayashi; Yoshio Onodera, both of Sendai; Takashi Iwasaki, Tagajo; Osamu Itabashi; Kazuo Torii, both of Sendai, all of Japan

[73] Assignee: Agency of Industrial Science and Technology, Japan

[21] Appl. No.: 404,097

[22] Filed: Mar. 14, 1995

[30] Foreign Application Priority Data

May 6, 1994 [JP] Japan ................................ 6-117621

[51] Int. Cl.⁶ ........................... C01F 17/00; C02F 1/42
[52] U.S. Cl. ........................................ 210/682; 423/263
[58] Field of Search ............................ 210/682; 423/263

[56] References Cited

U.S. PATENT DOCUMENTS 2,449,050  9/1948  Bond et al. ............................ 423/263
2,943,059  6/1960  Beck et al. ............................ 210/682
3,615,807  10/1971 Yates ..................................... 423/263
5,085,845  2/1992  Ueda et al. ............................ 210/682

FOREIGN PATENT DOCUMENTS 145408  6/1990  Japan .

OTHER PUBLICATIONS

Chemical Abstracts citation 91:142687g (1979).

*Primary Examiner*—Wayne Langel
*Attorney, Agent, or Firm*—Wenderoth, Lind & Ponack

[57] ABSTRACT

Disclosed is a novel hydrous composite oxide of cerium (IV) and phosphorus characterized by the specified chemical composition and the unique X-ray diffractometric pattern, which is useful as an adsorbent or immobilizing agent of strontium ions in an aqueous solution such as radioactive wastes from atomic power plants. The composite oxide prepared by the precipitation reaction of a Ce (IV) salt in an aqueous solution and phosphoric acid can be imparted with an increased adsorption capacity for strontium ions when the precipitates are heat-treated under hydrothermal conditions at up to 300° C. Immobilization of strontium ions adsorbed on the adsorbent can be more complete when the adsorbent bearing strontium ions is dried and subjected to a heat treatment at a temperature of 200° C. or higher.

7 Claims, No Drawings

HYDROUS COMPOSITE CERIUM-PHOSPHORUS OXIDE FOR IMMOBILIZATION OF STRONTIUM IONS IN SOLUTION

BACKGROUND OF THE INVENTION

The present invention relates to a novel hydrous composite oxide of cerium and phosphorus and a method for the immobilization of strontium ions in a solution. More particularly, the invention relates to a novel hydrous composite oxide of cerium and phosphorus which can be used as a chemisorptive adsorbent for the immobilization of strontium ions in an aqueous solution with high efficiency at a relatively low temperature under hydrothermal conditions as well as to a method for the immobilization of strontium ions using the same as an adsorbent.

One of the very serious issues in the atomic industry is disposal of high-level radioactive waste materials coming from spent nuclear fuels after use in atomic power plants, the amount thereof being under progressive increase year by year. Among the various methods for the disposal of the radioactive wastes heretofore proposed, one of the promising methods is to convert the radioactive waste into a vitrified solid mass which is embedded deep in a stable stratum of ground so as to be isolated from the biosphere. A problem in this method is that, since some of the inorganic radioactive nuclides such as strontium, cesium and the like have high solubility in water in the form of ions, these nuclides contained in the vitrified radioactive waste material are always under a risk of leaching out from the vitrified solid mass when intrusion of the underground water takes place into the stratum where the vitrified radioactive waste material is embedded to cause radioactive contamination of the biosphere.

In this regard, a countermeasure is under consideration in which the vitrified mass of radioactive waste materials containing the nuclides of strontium, cesium and the like and embedded in a stratum of ground is surrounded by a barrier of solid materials having activity as an adsorbent or as an immobilizing agent for the ions of strontium, cesium and the like in order to prevent infiltration of these radioactive ions through the strata. It is reported in Japanese Patent Kokai 3-293598 and 4-143700 that certain bentonite materials of which the principal constituent is smectite have high activity for the immobilization of cesium ions in an aqueous solution but these bentonite materials cannot be an immobilizing agent for strontium ions due to their low immobilizing activity for strontium ions.

It is also reported in Chemistry Letters, page 957 (1981) that crystalline titanate fibers have high immobilizing activity for strontium ions. The crystalline titanate fibers, however, have a disadvantage in respect of safety and from the economical standpoint because the fibers cannot be imparted with full immobilizing activity for strontium ions unless they are subjected to a heat treatment at a very high temperature of 1000° C. or even higher.

In view of the above described situations in the matter of disposal of radioactive waste materials, the inventors have conducted extensive investigations with an object to discover an adsorbent having high immobilizing activity for strontium ions but free from the above described problems and disadvantages in the prior art materials including a wide variety of synthetic works to uncover such an effective adsorbent material as well as a method for the immobilization of strontium ions in a solution by using the adsorbent.

SUMMARY OF THE INVENTION

The present invention accordingly has an object to provide a novel and improved adsorbent material having high immobilizing activity for strontium ions in an aqueous solution as well as to provide a method for the immobilization of strontium ions in an aqueous solution by using the adsorbent.

Thus, the present invention provides a novel adsorbent having high immobilizing activity for strontium ions in an aqueous solution which is a hydrous composite oxide of cerium and phosphorus having a chemical composition expressed by the formula $$Ce(HPO_4)_x \cdot yH_2O, \qquad (I)$$

in which the subscript x is a positive number in the range from 1.8 to 2.1 and y is a positive number in the range from 1 to 4. This adsorbent material, which is a novel material not known in the prior art nor described in any literatures, is characterized, though not highly crystalline, by the X-ray diffractometric diagram showing a pattern with a strongest line at a lattice spacing d of 1.10 nm accompanied by two broad peaks at lattice spacings d of about 0.35 nm and 0.52 nm.

While the above described hydrous composite oxide of cerium and phosphorus can be prepared by a precipitation reaction between an aqueous solution of phosphoric acid and an aqueous solution of a water-soluble cerium (IV) salt, it was unexpectedly discovered that the strontium-immobilizing activity of the composite oxide can be further enhanced when the composite oxide was subjected to a heat treatment under hydrothermal conditions. The thus obtained hydrous composite oxide of cerium and phosphorus, although the chemical composition thereof is expressed equally by the above given formula (I), is imparted with increased crystallinity characterized by the X-ray diffractometric diagram showing a pattern with many diffraction lines including those at lattice spacings d of 0.526 nm, 0.350 nm and 1.05 nm.

The method of the invention for the immobilization of strontium ions in an aqueous solution comprises bringing the above defined hydrous composite oxide of cerium and phosphorus into contact with the aqueous solution, preferably, under hydrothermal conditions at a temperature in the range from 100° to 300° C. so that the strontium ions in the aqueous solution can be chemisorbed on to the composite oxide as an adsorbent and immobilized thereon. The immobility of the strontium ions adsorbed on the composite oxide even in an acidic medium can be further enhanced when the composite oxide bearing the strontium ions is separated from the aqueous medium, from which the strontium ions have been adsorbed thereon, dried and subjected to a heat treatment at a temperature of 200° C. or higher.

DETAILED DESCRIPTION OF THE PREFERRED EMBODIMENTS

As is described above, the novel adsorbent material for strontium ions in an aqueous solution unexpectedly discovered by the inventors is a hydrous composite oxide of cerium and phosphorus having a chemical composition of the formula (I) and characterized by the unique pattern of the X-ray diffractometric diagram not found in any published X-ray diffractometric data files such as so-called ASTM Cards and the like.

The above mentioned hydrous composite oxide of cerium and phosphorus can be prepared by the precipitation reaction in which an aqueous solution of phosphoric acid and an aqueous solution of a water-soluble cerium (IV) salt such as cerium (IV) sulfate are mixed together to form precipitates followed by recovery of the precipitates from the aqueous medium and drying. The precipitation reaction is performed usually by gradually adding an aqueous solution of a water-soluble cerium (IV) salt to an aqueous solution of phosphoric acid at a temperature of, preferably, from 80° to 95° C. The precipitation reaction is complete within a few hours in this temperature range and the reaction time can be decreased by increasing the temperature. The concentration of phosphoric acid in the starting aqueous solution thereof should be in the range from 0.2 to 10.0 moles/liter or, preferably, from 1.0 to 6.0 moles/liter. It has been found that the concentration of phosphoric acid has an influence on the crystallinity of the precipitated composite oxide which is higher when the concentration of phosphoric acid is higher.

The concentration of the water-soluble cerium (IV) salt in the other aqueous starting solution should be in the range from 0.001 to 1.0 mole/liter or, preferably, from 0.01 to 1.0 mole/liter. The mixing proportion of the aqueous solutions of phosphoric acid and cerium (IV) salt depends on the desired value of the subscript x in the formula (I) given above.

The water-soluble cerium (IV) salt used in the precipitation reaction is typically cerium (IV) sulfate or cerium (IV) nitrate but certain water-soluble cerium (III) salts such as cerium (III) chloride can be used by oxidizing the cerium (III) ions in an aqueous solution with addition of an oxidizing agent such as hydrogen peroxide. The solubility of the cerium (IV) salt and stability of the cerium (IV) ions in an aqueous solution can be enhanced by the admixture of the aqueous solution with an inorganic acid such as sulfuric acid. It is optional that the solvent of the aqueous solution is a mixture of water and a minor amount of a water-miscible organic solvent.

The precipitates of the composite oxide formed in the slurried aqueous medium usually have a fibrous form having a diameter of 10 to 40 nm so that, when the slurry is filtered through a filter paper or filter cloth, a mat-like cake of the precipitate fibers is formed on the filter paper or cloth even without using a binder, which can be used as such for the immobilization treatment of strontium ions after drying at a temperature not exceeding 200° C. or, preferably, in the range from room temperature to about 80° C. although it is optional to disintegrate the dried mat-like cake into discrete fibers or to shape the discrete fibers into a desired form according to need.

While the above obtained composite oxide of cerium and phosphorus has a relatively low crystallinity characterized by the relatively broad peaks in the pattern of the X-ray diffractometric diagram showing the strongest line at a lattice spacing d of 1.10 nm accompanied by two broad peaks at lattice spacings d of about 0.35 nm and 0.52 nm, it has been unexpectedly discovered that, when the composite oxide having the crystallinity mentioned above is subjected to a heat treatment under hydrothermal conditions, the precipitates can be imparted with increased crystallinity along with conversion of the form of the precipitates from fibrous into predominantly platelet-like form. The thus formed platelet-like composite oxide is characterized by the unique pattern of the X-ray diffractometric diagram showing many diffraction lines including those having lattice spacings d at 0.526 nm, 0.350 nm and 1.05 nm with an intensity decreasing in this order. Further unexpectedly, this hydrothermal treatment of the composite oxide of cerium and phosphorus has an effect to enhance the activity of the composite oxide for the immobilization of strontium ions from an aqueous solution as is demonstrated by the immobilization experiments described later.

The above mentioned hydrothermal treatment of the hydrous composite oxide of cerium and phosphorus is performed in an aqueous medium, which can be the precipitation medium as such, using an autoclave at a temperature in the range from 100° to 300° C. under a pressure in the range from 0.1 to 8.7 MPa for a length of time in the range from 0.5 to 3 hours. The pressure in the autoclave can be the spontaneous pressure of the water vapor at the respective temperature although it is optional to further pressurize up to 100 MPa, if necessary. In this way, the composite oxide can be imparted with 0.1 to 1.9 mmoles/g of capacity for the immobilization of strontium ions from an aqueous solution while the capacity of the same composite oxide before the hydrothermal treatment usually cannot exceed 1.0 mmole/g.

The hydrous composite oxide of cerium and phosphorus prepared in the above described manner has activity for the immobilization of strontium ions in an aqueous solution so that, when the composite oxide is brought into contact with the aqueous solution, the strontium ions are chemisorbed by and immobilized on the composite oxide. It is preferable that the above mentioned contacting treatment of the composite oxide and the strontium-containing aqueous solution is conducted under hydrothermal conditions at a temperature of 100° to 300° C. for several hours to about 24 hours depending on the temperature, the velocity of adsorption being higher at a higher temperature.

It has been found that the pH value of the strontium-containing aqueous solution has some influences on the strontium-immobilizing capacity of the composite oxide for strontium ions and the capacity can be more fully exhibited by increasing the pH of the aqueous solution, which, however, should be in the range from 1 to 12 or, preferably, from 2 to 10 because, when the pH of the aqueous solution is too high, the composite oxide of cerium and phosphorus may eventually be peptized due to the hydrolysis of the phosphate groups.

The composite oxide bearing the strontium ions adsorbed thereon is, if necessary, washed with water and dried prior to the final disposal thereof either as such or after disintegration. Drying of the wet composite oxide can be performed at a temperature in the range from room temperature to 80° C. either in a desiccator containing a conventional desiccant or in a drying oven.

Further unexpectedly, it has been found that the immobilization strength of strontium ions on the composite oxide can be increased when the composite oxide bearing the strontium ions is subjected to a dry heat treatment at a temperature of 200° C. or higher or, preferably, in the range from 300° to 500° C. so that the strontium ions held on the composite oxide can no longer be leached out substantially even when the strontium-bearing composite oxide is contacted with an acidic aqueous medium because the adsorption of strontium ions on the composite oxide is not a simple reversible adsorption but a type of chemisorption by which the strontium ions are incorporated into the structure of the composite oxide. This heat treatment is performed in a conventional drying oven or electric furnace in an atmosphere of air or, if necessary, in an atmosphere of an inert gas such as nitrogen, argon and the like. The heat treatment is performed for at least 0.5 hour or, preferably, for at least 1 hour though dependent on the temperature. The amount of the immobilized strontium ions can be estimated by the difference between the decrease of the strontium ions in the starting strontium-containing aqueous solution and the amount of the strontium ions leached out when the strontium-bearing composite oxide is contacted with an acidic medium as described later.

Since the immobilizing treatment for strontium ions by using the inventive hydrous composite oxide of cerium and phosphorus can be performed under hydrothermal conditions, it would be a possible way for the in situ removal of strontium ions from the cooling water circulating in an atomic power plant without bringing the water under a normal pressure by cooling so that the inventive method for the immobilization of strontium ions is applicable also for the disposal of low-level radioactive waste materials. Needless to say, the strontium-bearing composite oxide can be readily separated from the aqueous medium of the system before final disposal thereof.

As is understood from the above given description, the novel hydrous composite oxide of cerium and phosphorus is very advantageous for the purpose of immobilization of strontium ion in an aqueous solution because (1) the composite oxide can be prepared by a simple process, (2) the composite oxide has a large capacity for the immobilization of strontium ions, (3) the capacity for the immobilization of strontium ions can be further enhanced when the composite oxide is subjected to a hydrothermal treatment, (4) the immobilization treatment therewith can be performed at a relatively low temperature and (5) the stability of the immobilized strontium ions adsorbed on the composite oxide can be increased by subjecting the strontium-bearing composite oxide to a dry heat treatment.

In the following, a more detailed description is given to illustrate the invention by way of examples, which, however, never limit the scope of the invention in any way.

EXAMPLE 1

An aqueous phosphoric acid solution prepared by diluting 200 ml of phosphoric acid solution in a concentration of 14 moles/liter by adding water to make up a volume of 500 ml was introduced into a three-necked flask of 1 liter capacity and heated and kept at 90° C. An aqueous solution of cerium (IV) sulfate, which was prepared separately by dissolving 22.9 g of a reagent-grade cerium (IV) sulfate monohydrate having a purity of 95% in 500 ml of water with admixture of 16 ml of a 18 moles/liter aqueous solution of sulfuric acid, was added dropwise into the aqueous phosphoric acid solution under agitation at a rate of 4 ml per minute so that precipitates were formed in the mixture. After completion of the dropwise addition of the cerium sulfate solution, the mixture in the flask was agitated for further 8 hours by keeping the temperature at 90° C. followed by filtration to collect the precipitates which were thoroughly washed with water and dried at room temperature.

The thus obtained composite oxide was identified by analysis to have a chemical composition expressed by the formula $Ce(HPO_4)_{2.01} \cdot 3.3H_2O$. As examined by the electron microscopy, the thus obtained hydrous composite oxide consisted of fibrous bodies having a diameter of 30 to 40 nm and agglomerated into relatively loose fluxes. This hydrous composite oxide of cerium and phosphorus had an ion exchange capacity of 2.1 meq/g for strontium ions.

A 0.1 g portion of the above obtained composite oxide was taken in a hermetically sealable tube of 25 ml capacity together with 10 ml of a 0.01 mole/liter aqueous solution of strontium nitrate and kept for 7 days at a temperature of 100° C., 150° C., 200° C. , 250° C. or 300° C. to effect adsorption of the strontium ions on the composite oxide under hydrothermal conditions. The sealable tubes used here were made from Teflon when the heating temperature was 250° C. or lower and made from gold when the heating temperature was 300° C. After cooling to room temperature, the composite oxide having the strontium ions adsorbed thereon was recovered from the mixture by filtration and the filtrate was analyzed for strontium ions to determine the amount of the strontium ions adsorbed on to the adsorbent. The composite oxide was thoroughly washed with water and dried by heating for 24 hours in a drying oven at 50° C. The X-ray diffractometric diagram of this composite oxide indicated presence of $CePO_4$ and $SrCeO_3$ besides many other unidentified diffraction lines.

A 0.05 g portion of the thus obtained strontium-bearing adsorbent was taken in a glass bottle of 25 ml capacity together with 10 ml of a 1 mole/liter hydrochloric acid and the bottle was shaken for 24 hours at 25° C. After standing the bottle to settle the adsorbent, the supernatant was taken and analyzed for the content of strontium ions leached out therein by desorption to calculate the amount of immobilized strontium ions which was the difference between the adsorbed amount and the desorbed amount. The results are summarized in Table 1 below for the adsorbed, desorbed and immobilized amounts of strontium ions at each temperature of the hydrothermal adsorption tests. These results indicate that the amounts of the adsorbed and immobilized strontium ions are increased as the temperature, at which the adsorption treatment is performed, is increased.

TABLE 1

| Hydrothermal temperature, °C., | Amount of Sr ions, mmoles/g | | |
|---|---|---|---|
| for adsorption | adsorbed | desorbed | immobilized |
| 100 | 0.498 | 0.236 | 0.262 |
| 150 | 0.553 | 0.148 | 0.405 |
| 200 | 0.677 | 0.086 | 0.591 |
| 250 | 0.831 | 0.214 | 0.617 |
| 300 | 1.012 | 0.310 | 0.702 |

EXAMPLE 2

The experimental procedure was substantially the same as in Example 1 except that the concentration of strontium nitrate in the aqueous solution, from which the adsorption of strontium ions on to the adsorbent was effected, was 0.05 mole/liter instead of 0.01 mole/liter. The results of the experiments are shown in Table 2 below for each of the temperatures.

TABLE 2

| Hydrothermal temperature, °C., | Amount of Sr ions, mmoles/g | | |
|---|---|---|---|
| for adsorption | adsorbed | desorbed | immobilized |
| 100 | 0.720 | 0.328 | 0.392 |
| 150 | 0.756 | 0.168 | 0.588 |
| 200 | 1.126 | 0.111 | 1.015 |
| 250 | 1.279 | 0.319 | 0.960 |
| 300 | 1.390 | 0.402 | 0.988 |

EXAMPLE 3

The experimental procedure was substantially the same as in Example 2 except that the hydrous composite oxide of cerium and phosphorus prepared in Example 1 by the precipitation reaction at 90° C. was subjected, prior to the adsorption test of strontium ions, to a hydrothermal treatment at 150° C. for 1 hour. The results of the experiments are shown in Table 3 below for each of the temperatures. Comparison of the data in Tables 2 and 3 indicates that the hydrothermal treatment of the adsorbent composite oxide is effective to increase the adsorbed and immobilized amounts of strontium ions, especially, when the temperature for adsorption is 150° C. or higher.

TABLE 3

| Hydrothermal temperature, °C., for adsorption | Amount of Sr ions, mmoles/g | | |
|---|---|---|---|
| | adsorbed | desorbed | immobilized |
| 100 | 0.184 | 0.092 | 0.092 |
| 150 | 1.004 | 0.137 | 0.867 |
| 200 | 1.776 | 0.096 | 1.680 |
| 250 | 1.855 | 0.308 | 1.547 |
| 300 | 1.911 | 0.381 | 1.530 |

EXAMPLE 4

A 2 g portion of the hydrous composite oxide of cerium and phosphorus prepared in Example 1 was taken as an adsorbent in an Erlenmeyer flask of 250 ml capacity together with 100 ml of a 0.01 mole/liter aqueous solution of strontium nitrate and the flask was shaken for 7 days at 25° C. The strontium-bearing adsorbent collected by filtration was washed with water and dried by heating at 50° C. for 24 hours in a drying oven. The amount of the strontium ions adsorbed on the adsorbent was 0.200 mmole/g as determined by analyzing the filtrate for the unadsorbed strontium ions.

Each a 0.4 g portion of the thus prepared strontium-bearing adsorbent was taken in five porcelain crucibles and heated for 2 hours at 100° C., 200° C., 300° C., 400° C. and 500° C. in an electric furnace to effect dry heat treatment of the adsorbent. The desorption test of the strontium ions in a hydrochloric acid solution from the thus prepared strontium-bearing adsorbents was undertaken in the same manner as in Example 1 to give the results of the desorbed and immobilized amounts of the strontium ions shown in Table 4 below for each of the temperatures for the dry heat treatment. As is understood from these results, the amount of the desorbed strontium ions is decreased as the temperature for the dry heat treatment of the strontium-bearing adsorbent is increased and immobilization of the adsorbed strontium ions is substantially complete when the temperature is 300° C. or higher.

TABLE 4

| Temperature, °C., for dry heat treatment | Amount of Sr ions, mmoles/g | |
|---|---|---|
| | desorbed | immobilized |
| — | 0.195 | 0.005 |
| 100 | 0.191 | 0.009 |
| 200 | 0.105 | 0.095 |
| 300 | 0.006 | 0.194 |
| 400 | 0.005 | 0.195 |
| 500 | 0.001 | 0.199 |

EXAMPLE 5

The composite oxide adsorbent having 1.855 mmoles/g of strontium ions adsorbed thereon, which was obtained in Example 3 by the hydrothermal adsorption test at 250° C., was, after thorough washing with water and drying, subjected to a dry heat treatment at 300° C. for 2 hours and subjected to the desorption test in the same manner as in Example 1 to determine the immobilized amount of strontium ions which was found to be 1.839 mmoles/g indicating substantially complete immobilization of the adsorbed strontium ions.

What is claimed is:

1. A hydrous composite oxide of cerium and phosphorus having a chemical composition expressed by the formula $$Ce(HPO_4)_x \cdot yH_2O,$$

in which the subscript x is a positive number in the range from 1.8 to 2.1 and y is a positive number in the range from 1 to 4, and exhibiting an X-ray diffractometric diagram showing a pattern with a strongest line at a lattice spacing d of 1.10 nm and two broad peaks at lattice spacings d of about 0.35 nm and 0.52 nm.

2. A hydrous composite oxide of cerium and phosphorus having a chemical composition expressed by the formula $$Ce(HPO_4)_x \cdot yH_2O,$$

in which the subscript x is a positive number in the range from 1.8 to 2.1 and y is a positive number in the range from 1 to 4, and exhibiting an X-ray diffractometric diagram showing a pattern with diffraction lines at lattice spacings d of 0.526 nm, 0.350 nm and 1.05 nm.

3. A method for the preparation of a hydrous composite oxide of cerium and phosphorus having a chemical composition expressed by the formula:

$$Ce(HPO_4)_x \cdot yH_2O$$

in which the subscript x is a positive number in the range from 1.8 to 2.1 and y is a positive number in the range from 1 to 4, and exhibiting an X-ray diffractometric diagram showing a pattern with diffraction lines at lattice spacings d of 0.526 nm, 0.350 nm and 1.05 nm, which comprises the steps of:

(a) mixing together an aqueous solution of a water-soluble cerium (IV) salt and phosphoric acid to form precipitates in an aqueous precipitation medium; and (b) heating the precipitates in an aqueous medium at a temperature in the range from 100° C. to 300° C. for a length of time of at least 0.5 hour to form said hydrous composite oxide of cerium and phosphorus.

4. A method for the immobilization of strontium ions in an aqueous solution which comprises the steps of:

(a) bringing an adsorbent which is a hydrous composite oxide of cerium and phosphorus having a chemical composition expressed by the formula $$Ce(HPO_4)_x \cdot yH_2O,$$

in which the subscript x is a positive number in the range from 1.8 to 2.1 and y is a positive number in the range from 1 to 4, into contact with the aqueous solution containing strontium ions under a hydrothermal condition at a temperature in the range of from 100° C. to 300° C. for at least one hour, to effect adsorption of the strontium ions on to the adsorbent; and (b) separating the adsorbent from the aqueous solution.

5. The method for the immobilization of strontium ions in an aqueous solution as claimed in claim 4 in which the adsorbent separated from the aqueous solution in step (b) is further dried and heated at a temperature of 200° C. or higher.

6. The method for the immobilization of strontium ions in an aqueous solution as claimed in claim 5 in which the temperature at which the adsorbent separated from the aqueous solution in step (b) is dried and heated is in the range from 300° C. to 500° C.

7. The method for the immobilization of strontium ions in an aqueous solution as claimed in claim 5 in which the length of time for which the adsorbent separated from the aqueous solution in step (b) is dried and heated is at least 0.5 hour.

* * * * *

UNITED STATES PATENT AND TRADEMARK OFFICE
CERTIFICATE OF CORRECTION

PATENT NO. : 5,573,673
DATED : November 12, 1996
INVENTOR(S) : Hiromichi HAYASHI et al.

It is certified that error appears in the above-indentified patent and that said Letters Patent is hereby corrected as shown below:

ON THE TITLE PAGE:

Item [73] (Assignee) on the face of the patent, correct the name of Assignee to "Japan as represented by Director General of Agency of Industrial Science and Technology".

Signed and Sealed this

Second Day of September, 1997

Attest:

BRUCE LEHMAN

Attesting Officer

Commissioner of Patents and Trademarks